US012669801B2

(12) United States Patent
Gerritsen et al.

(10) Patent No.: US 12,669,801 B2
(45) Date of Patent: Jun. 30, 2026

(54) THICKNESS COMPENSATION IN A CUTTING AND BENDING PROCESS

(71) Applicant: BYSTRONIC LASER AG, Niederoenz (CH)

(72) Inventors: Gerrit J. W. Gerritsen, Cuarnens (CH); Wilfried Liegard, Bern (CH)

(73) Assignee: BYSTRONIC LASER AG, Niederoenz (CH)

( * ) Notice: Subject to any disclaimer, the term of this patent is extended or adjusted under 35 U.S.C. 154(b) by 1050 days.

(21) Appl. No.: 17/757,418

(22) PCT Filed: Dec. 16, 2020

(86) PCT No.: PCT/EP2020/086365
§ 371 (c)(1),
(2) Date: Jun. 15, 2022

(87) PCT Pub. No.: WO2021/122704
PCT Pub. Date: Jun. 24, 2021

(65) Prior Publication Data
US 2023/0010023 A1     Jan. 12, 2023

(30) Foreign Application Priority Data
Dec. 16, 2019     (EP) .................................... 19216416

(51) Int. Cl.
*G05B 19/4155*     (2006.01)
*B23K 26/38*     (2014.01)

(52) U.S. Cl.
CPC .......... *G05B 19/4155* (2013.01); *B23K 26/38* (2013.01); *G05B 2219/35519* (2013.01)

(58) Field of Classification Search
CPC ...... G05B 2219/35519; G05B 19/4155; B23K 26/38
(Continued)

(56) References Cited

U.S. PATENT DOCUMENTS 5,375,340 A * 12/1994 Gerritsen ................. G01B 5/24
33/534
2001/0040153 A1* 11/2001 Lanouette .............. B23K 9/095
219/130.21
(Continued)

FOREIGN PATENT DOCUMENTS

CH          654761 A5     3/1986
DE     202005011455 U1     10/2005
(Continued)

OTHER PUBLICATIONS

International Search Report and Written Opinion, mailed Feb. 5, 2021, from PCT/EP2020/086365 filed Dec. 16, 2020.

*Primary Examiner* — Jimmy Chou
(74) *Attorney, Agent, or Firm* — Workman Nydegger

(57)     ABSTRACT
The present invention relates to a computer-implemented method and a planer for calculating at least one supplementary processing plan for a workpiece to be processed by a processing machine. The method comprises the steps of: Measuring workpiece properties, including a thickness parameter of the workpiece; Providing at least one supplementary processing plan, which is specific for the measured workpiece properties. Due to the present invention, measurement of the workpiece properties is performed before starting to process the workpiece. Therefore, time and material can be saved, and scrap and waste are reduced.

13 Claims, 8 Drawing Sheets

(58) Field of Classification Search
USPC ................................................... 219/121.72
See application file for complete search history.

(56)                   References Cited

U.S. PATENT DOCUMENTS

| | | | |
|---|---|---|---|
| 2004/0111177 A1* | 6/2004 | Gerritsen ................ | B21D 5/02 |
| | | | 700/165 |
| 2004/0262277 A1* | 12/2004 | Mika ....................... | G06T 7/001 |
| | | | 219/121.85 |
| 2009/0321397 A1* | 12/2009 | Krishnaswami ....... | B23K 26/40 |
| | | | 219/121.68 |
| 2010/0015783 A1* | 1/2010 | Fukuyo ................. | B28D 1/221 |
| | | | 219/121.72 |
| 2011/0220621 A1* | 9/2011 | Pieger ............... | B23K 35/0244 |
| | | | 219/121.85 |
| 2011/0235055 A1* | 9/2011 | Buehler ................ | G01N 21/95 |
| | | | 219/385 |

| | | | |
|---|---|---|---|
| 2013/0068737 A1* | 3/2013 | Saito ........................ | B28D 5/00 |
| | | | 219/121.72 |
| 2014/0091072 A1* | 4/2014 | Mammila .......... | B23K 26/0838 |
| | | | 219/158 |
| 2014/0156051 A1* | 6/2014 | Miquel ................ | G05B 19/401 |
| | | | 700/110 |
| 2015/0251267 A1* | 9/2015 | Winn ..................... | B23K 10/00 |
| | | | 83/76.1 |
| 2016/0001395 A1* | 1/2016 | Filewich ............... | F01D 21/003 |
| | | | 219/121.85 |
| 2016/0059358 A1* | 3/2016 | Ootsu ................. | B23K 26/702 |
| | | | 219/121.72 |
| 2018/0250778 A1* | 9/2018 | Fumagalli ............ | B23K 37/053 |

FOREIGN PATENT DOCUMENTS

| | | | | |
|---|---|---|---|---|
| EP | 1338371 A1 | 8/2003 | | |
| WO | WO-2012000995 A1 * | 1/2012 | ............. | G06N 5/045 |

* cited by examiner

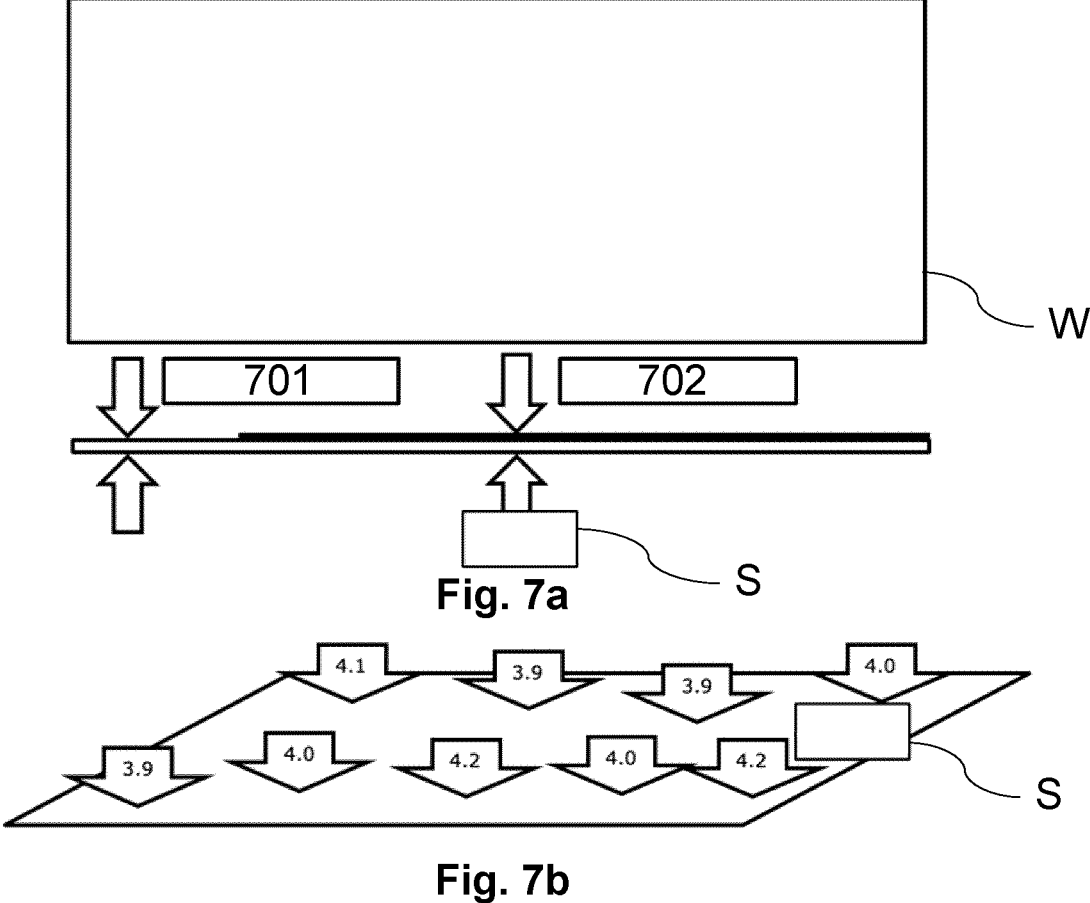
Fig. 7a
Fig. 7b
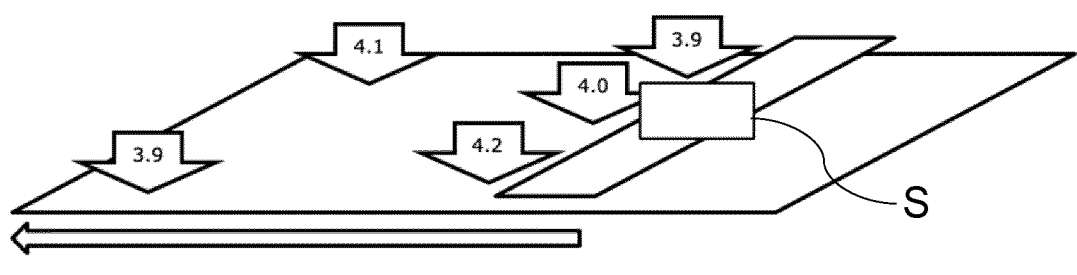
Fig. 7c

THICKNESS COMPENSATION IN A CUTTING AND BENDING PROCESS

The present invention relates to a computer-implemented method and a planner for calculating at least one supplementary processing plan for a workpiece to be processed and to an automation system.

The present invention is focused on metal processing, in particular on sheet metal processing. Cutting and bending are important tasks in the metal processing industry. In order to achieve the best result, physical peculiarities of the process as well as properties of the metal have to be considered. Cutting is the partial or complete separation of a body or system into two or more pieces. By carefully programming and applying cutting parameters to a cutting machine, sheet metal can be quickly and precisely cut in two or more pieces by achieving good tolerance values as well as good edge quality. Due to inaccuracies in the manufacturing process of the sheet metal, properties of the sheet metal may change. In case of changing properties, an operator must intervene in the cutting process. The operator has to change the parameter of the cutting machine and to retry whether the cutting quality matches the requirements. Conventional cutting productions are highly automatized with less operators. This may lead into issues when properties of sheet metal changing while processing sheet metal and performing the cutting process. These issues can be overcome by using options and features, which may help to process in a continuous matter.

On the bending side, the processing is different in comparison to the cutting. Bending is a manufacturing process that may produce different shapes along a straight axis in ductile materials, most commonly sheet metal. Bending is the forming of sheet metal by the application of a force, which acts on the material uniformly and linearly over a certain length, either point by point or as a line load. This force is also called bending moment. The bending of sheet metal can be carried out on press brakes, round bending and embossing machines. Conventional bending machines provide solutions to guarantee a good bending angle tolerance. Bending angle variations may occur because of various reasons or a combination of various reasons. The reasons may be a variation in sheet metal thickness, in the grain direction of the sheet metal, and the variation of the tensile strength. A further reason is the bend radius variation which is often but not solely the result of the sheet thickness variation, grain direction, and tensile strength variation.

The bending of sheet metal, which includes folding, wiping, air-bending, coining, bottoming, edge bending is in principle effected by folding a surface part over the remaining surface part of a sheet metal. Depending on the tools or industrial processes and machines used, relevant characteristics on the workpiece such as bending edge, bending angle or bending radius are more or less precisely defined and reproducible. For dimensionally accurate machining, the bending deduction and the sheet metal flanges must be considered and be pre-planned. For this planning the correct properties—in particular e.g. thickness—of the metal sheet have to be considered.

In current cutting and bending processes in state of the art, the machines are set up on the basis of the theoretical values (e.g., theoretical or nominal thickness of the sheet metal) given by the sheet metal suppliers. Alternatively, the thickness of the sheet metal may be measured manually by the operator of the machine, mostly by the operator of the bending machine. However, if at all, the thickness value may only be used to adjust the bend angle. It is not possible to use for adjustment of the whole processing plan with e.g. flat blank size and back gauge. Further, the risk is that the given values are not correct, or they vary over the sheet metal so that wrong values are used for processing the sheet metal, which can lead to errors in processing.

In the state of the art, several systems are known to compensate or correct the issue with wrong values for the thickness and as a result with the false calculated bending angle. For instance, patent documents CH654761A5, U.S. Pat. No. 5,375,340 disclose mechanical measurement systems to measure the bending angle. Further systems are known to measure the bending angle with optical components. Patent document US 2004/111177 discloses a sheet thickness variation compensation. The major press brake suppliers provide solutions as disclosed in the cited patent documents and achieve a result of a bending angle within 0.5°. Only the most expensive systems comprise a solution as disclosed within patent documents CH654761A5, U.S. Pat. No. 5,375,340 for an in-process correction of the bending angle. Patent document US 2004/111177 discloses a solution that can be in-processed but often only offer a partial solution. Therefore, systems that provide a solution for correcting a wrong calculated bending angle requires high amount of investments.

Patent document EP 1 338 371 A1 discloses a laser cutting machine. Therein, the thickness of an object is measured in order to determine a light-converging point of the laser light. By means of the light-converging point a modified pre-weakening or "crack" region is established which facilitates cutting of the object.

Utility model DE 20 2005 011 455 U1 describes measuring the layer thicknesses of a 3-dimensional vehicle interior object like a vehicle dashboard or a vehicle interior trim and determining thereupon a laser power required for machining the vehicle interior trim.

Patent document US 2014/0156051 A1 describes control of the quality of objects like 3-dimensional medical protheses to be manufactured by using a robot, equipped with a laser, where it is necessary for the medical prostheses to be adapted to exactly fit each patient's unique anatomical features by measuring the prothesis' dimensions, like its thickness, height, length, diameter, curves etc.

A further factor of wrong or incorrect flanges is the perpendicularity of the cut edge. This is the point, which the operator pushes against the back gauge. When this edge is not perfectly square, the flange will have a wrong dimension, and therefore the bending process is performed at the wrong position. In addition, burrs at the edge may cause issues. This means, that the flange dimension is directly dependent on the edge quality. Thus, the quality of the cutting process has an impact on the quality of the subsequent bending process.

FIG. 3 schematically shows a flowchart of a state-of-the-art method to produce a bend part. A software 300 for operating the machines for manufacturing a 3D part is provided, processing a 3D data format 301, representing the 3D part to be manufactured. The 3D part is unfolded in a plane shape. This shape is used to program a computer program 302 to be executed on the respective machines for cutting and bending. In particular, the program 302 comprises instructions how to cut and bend a metal sheet. A processing machine 310, such as a laser cutting machine and/or an automation system loads the metal sheet 311. The processing machine 310 loads the program 302. The processing machine 310 performs the program 302 and cuts the sheet metal according to the plan (program 302). After performing the cutting process, the cut parts are transported to a further processing machine 320, such as a bending machine and/or an automation system. The processing device 320 receives the cut parts and loads the program 302. The processing machine 320 (bending machine) performs the program 302 and bends the cut parts according to the plan (program 302). The state-of-the-art method operates the processes in a separate way without linking those processes to each other and without linking to material properties of the sheet metal that is used to produce the parts as cut. Thus, the method does not consider specific parameters of the sheet metal. In certain systems, an operator may manually adjust specific settings of the coded program for bending. In particular, during the bending process, the operator may only adjust the bend angle with regard to changing thickness. The parameters for the flat blank size or the back gauge remain unconsidered. That means, even with the most advanced equipment available for the operator, it is difficult to get parts cut within all the set tolerances as required. In addition, it is even more difficult to do this without producing any scrap.

Accordingly, it is an object of the present invention to provide a solution which allows performing a processing of sheet metal with higher accuracy and to improve the generation of processing plans in response to real, measured sheet properties. Moreover, quality of subsequent processing (e.g. bending) should be guaranteed, even if material properties change or are not perfect. Further, requirements of subsequent processes should be taken into account when generating a processing plan for a previous processing step (e.g cutting) having regard to actual material properties.

This object is solved by the subject-matter of the independent claims. Advantageous modifications, refinements and options are described in the dependent claims as well as in the description with reference to the drawings.

According to a first aspect, this object is solved by a computer-implemented method for calculating at least one supplementary processing plan for a sheet metal workpiece to be processed by a processing machine, namely a laser cutting machine and/or a bending machine (used for subsequent bending). The computer-implemented method comprises the steps of:

Measuring workpiece properties, including a thickness parameter of the workpiece;

Providing at least one supplementary processing plan, which is specific for the measured workpiece properties and serves for both for cutting and subsequent bending.

In the following the terms used within this application are defined in more detail.

A supplementary processing plan comprises instructions to be executed on a machine (cutting and/or bending) to perform the cutting and/or the bending of the metal sheet. The supplementary processing plan is a reworked plan of the previously programmed processing plan. Dependent on the measured workpiece properties the plan for the cutting process, or the plan for the bending process, or both have to be reworked. Reworked in the sense of the present invention means that the measured workpiece properties are taken into account when programming the instructions and/or the parameters of the supplementary processing plan to perform the cutting and/or the bending of the sheet metal.

In the present context, a workpiece should be understood to mean a particular sheet metal. Sheet metal can consist of different materials and may comprise different dimensions and/or different material properties, e.g. may have different thickness values, and even different thickness or other material property values on one sheet. It is further conceivable that other workpieces as sheet metal can be processed with the present invention, such as metal profiles or tubes.

Further, in the present context, the processing of work pieces should be understood to mean the metal processing of cutting and/or bending. Both processes can be performed independently of each other on one processing machine or on two separate processing machines. Further, it can be understood that only one process is performed either bending or cutting. Preferably a supplementary processing plan is provided at least for the cutting process.

Further, in the present context, a processing machine can be designed to comprise both, a cutting machine and a bending machine. Both, the cutting machine and the bending machine can be combined in one housing. Usually, the cutting machine and the bending machine are provided separately in separate housings. The transportation of the workpieces to the respective processing machine can be performed by a transport and lift unit or an automation system. An operator or a robot can lift the metal sheets on the transport and lift unit and the transport and lift unit transports the metal sheet into the processing machine. The same transport and lift unit or a further unit may transport the cut parts from the cutting machine to the bending machine. In a further embodiment a plurality of transport and lift units are used to provide transportation tasks. The cutting machine may comprise a laser for laser cutting. This embodiment has the technical advantage that mutual dependencies between both processes may be taken into account. This has is based on the fact that the cutting quality has an influence on the bending quality. For example, the edge quality is relevant for this process and has an influence on bending line position. Also problems might be solved with the contact on the matrix, if the thickness of the material changes.

An advantage of the method and planner according to the present invention is that the required parameters are measured in order to adapt the processing plan to get at least one supplementary processing plan before processing the workpiece. Moreover, the supplementary processing plan is provided before starting cutting the workpiece. The processes are adapted, by taking into account the material properties (e.g. thickness).

With the present invention, the material variations, which created the cutting/bending problems in prior art systems as described above are detected before the whole cutting process starts and therefore guarantee a more stable and continuous process, without the need to manually adjust certain cutting parameters.

In addition, the present invention allows to program and then to produce bend-parts within higher tolerances without corrections and without external measuring devices during the bend process. Thus, saving time and material, reducing scrap and waste and at the same time increasing the quality of the sheet metal products.

Additionally, bend parts can be produced with a better accuracy with varying sheet metal thickness with standardized machines. Further, the reliability of the complete automation system in improved.

Advantageous embodiments of the computer-implemented method according to the first aspect are described in the following. It should be understood that the described embodiments may be freely combined with one another, thus generating synergetic beneficial effects.

In some advantageous embodiments, the at least one supplementary processing plan may be specific for a property distribution over the workpiece (e.g. a thickness distribution over the workpiece to be cut). The at least one supplementary processing plan may be adapted to subsequent processing requirements (e.g. bending requirements). Generally, a supplementary processing plan may comprise a cutting plan or a bending plan. In an alternative embodiment, a supplementary processing plan may comprise both, a bending plan and a cutting plan. Advantageously, the present invention can be used for both metal processing methods. Further, an already existing processing plan, in particular a cutting plan and/or a bending plan can be adapted to subsequent processing requirements. The subsequent processing requirements may comprise cutting requirements or bending requirements. The bending requirements may comprise the material, which has to bend, the bending length, the bending angle, the used machine for bending, the thickness of material, as well as the grain of the material. Advantageously, the material properties and its distribution over the 2D sheet material are determined before starting the processing. The result is included in the computed supplementary processing plan. The same applies to the cutting requirements, which are included in the supplementary processing plan that is used for performing the cutting process.

In some advantageous embodiments, the processing of the workpiece comprises cutting, in particular cutting by a laser cutting machine, and the supplementary processing plan is a supplementary cutting plan for a laser cutting machine. Laser cutting machines become more and more import in modern industry due to the demand for highly precise products. Laser cutting machines may cut a variety of materials such as steel, copper, aluminum, titan, and gold. A laser cutting machine executes individual cutting tasks effortlessly and with high precision. Advantageously a supplementary cutting plan is provided before starting the cutting process. In particular, the supplementary cutting plan includes the properties of the workpieces that have to be processed. In this way, the cutting process can be adapted to the specific workpiece properties of each workpiece to be processed and even for potentially different cut part properties of one single workpiece. Therefore, the quality can be increased and in the same way the amount of scrap can be reduced.

In some advantageous embodiments, the processing of the workpiece may comprise cutting and subsequent bending of the workpiece and wherein at least the cutting plan is supplemented based on the measured workpiece properties and in addition based on the subsequent bending requirements. Using the correct thickness values "only" for calculating a supplementary cutting plan (without later bending) has the technical advantage that edge quality and perpendicularity can be improved. Moreover, cutting parameters of the laser machining head may e.g. be adapted. For instance, the speed, focal position etc. can be adapted.

Thus, in certain embodiments, only the cutting plan is adapted. The bending plan may be used without amendments. Alternatively, and in other certain embodiments, the bending plan may be adapted, too, based on the measured workpiece properties. Also, the supplementary cutting plan is calculated in response to the measured workpiece properties and on the technical requirements of the subsequent bending process. For instance, a thicker part needs perhaps to be cut longer to be able to achieve an appropriate 3D-part quality after the bending process. A supplemented cutting plan increases the edge quality and the perpendicularity can be improved by using the correct thickness. Further, the parameters of the cutting process itself can be changed and better adjusted to the workpiece to be processed. The parameter may comprise the speed, focal position, etc.

In some advantageous embodiments, the at least one supplementary processing plan is provided before start of the processing. Advantageously, the properties of the workpiece are measured before processing the workpiece. In this way, a supplementary processing plan can be provided that is adapted to the measured properties of the workpiece to be processed. Due to this, the material variation is considered and the processing is adapted to corresponding material variations.

In some advantageous embodiments, the method further comprises providing the supplementary processing plan to the processing machine. In some advantageous embodiments, the method further comprises operating the processing machine with the supplementary processing plan. Providing the supplementary processing plan to the processing machine includes a replacement of the existing process plan by the supplementary processing plan that is adapted to measured workpiece properties. Further, replacing may include removing the existing process from central processing unit or memory of the processing machine and uploading the supplementary processing plan for execution. Advantageously, the processing machine executes the supplementary processing plan including instructions for controlling the processing machine according to the measured workpiece properties.

In some advantageous embodiments, providing is implemented by calculating the at least one supplementary processing plan in an online procedure after the material properties have been measured. In the online-procedure, a processing plan, in particular a general processing plan that includes instructions to perform a processing for each workpiece independent of its properties, is uploaded to the processing machine. During the online procedure, the properties of the workpiece, such as the thickness of the workpiece are measured and the existing processing plan is updated according to the measurement and resulting at the same time in the supplementary processing plan. The thickness of the workpiece, for instance a sheet metal thickness is measured.

In an embodiment, the measuring may include dividing the workpiece into a grid and measuring for each part of the grid the corresponding properties. The grid may be defined according to the cutting plan so that one part may be comprised in one grid. The grid structure may be regular or irregular. The size of the grid and therefore the number of the parts are scalable. The scaling of the grid can be adjusted according to the deviation of the properties from the expected property values. Advantageously, a high scaling may result in more precise information, whether the properties are changing over the workpiece or stay the same. In a preferred embodiment, for each part of the grid, various workpiece properties are measured. The values of the measured workpiece, which differ from the corresponding values stored in the existing processing plan replace the values in the existing processing plan. The replacing of values results in the supplementary processing plan. In this way, no unnecessary calculations have to be performed.

The measurement of the workpiece properties can be performed before transporting the workpiece to the processing machine, for instance in the warehouse or locations different from the processing environment. In an embodiment, the measurement of the workpiece properties may be performed on the transportation unit (automation system) of the processing machine. In a preferred embodiment, the measurement of the workpiece properties may be performed in the processing machine.

In some advantageous embodiments, providing the supplementary processing plan may be implemented by an offline procedure. The offline procedure comprises selecting an appropriate processing plan from a set of pre-calculated processing plans for different workpiece properties. Advantageously, by using the offline-procedure, a various number of pre-calculated processing plans are provided. The pre-calculated processing plans are stored in a memory unit of the processing machine or in a memory, e.g. server, cloud, connected to the processing machine. The pre-calculated processing plans are calculated and programmed for different combination of workpiece properties and property values. For instance, different cutting and bending processing plans in various theoretical combinations are generated. In an embodiment, the workpiece is divided into a pattern or grid. Each part of the grid may have different values for the corresponding workpiece properties (can be measured). For each workpiece property combination as well as value of the workpiece property in a specific part of the grid, a processing plan is generated and stored in a memory. The size of the grid and therefore the number of the parts are scalable. The scaling of the grid can be adjusted according to the deviation of the properties from expected property values. The finest scale or the measurement could be the size of the part (cut out of the workpiece), which means one measurement per part. In this case, the workpiece properties can be adapted per cut part. In an even more finer scaling more than one measurement can be executed for one cut part or grid.

In the offline procedure, the workpiece properties of the workpiece to be processed are measured. For instance, the thickness of the workpiece, e.g. a sheet metal is measured. A set of supplementary processing plans has been generated and stored previously, as described above. From this set of supplementary processing plans, the appropriate and matching plan is selected which comprises identical property values or at least the slightest deviations. The selected plan is then uploaded to the processing machine to perform processing of the workpiece.

The computing of the supplementary processing plan is performed offline during the normal calculation and programming phase. The generation of the supplementary processing plans is performed in the background. To generate one supplementary processing plan takes, for instance, only a couple of milliseconds. Generating of 32 or more supplementary processing plans is a matter of seconds only. The generation can be well finished before the software operator reaches the end of his normal programming cycle.

Advantageously, in the offline procedure, all processing plans are always available. These processing plans can be provided for other machines. Having different processing plans available, it is possible to statistically find out how sheet metal is provided and automatically apply the different thickness and hardness patterns to further processing plans, which are cut on other processing machines without using measuring equipment.

In an embodiment, the measured properties and/or the values of the properties that deviates from values of the existing processing plan can be stored in a memory unit, e.g. a database. The stored values resulting in a supplementary processing plan may be used to train an artificial intelligence structure. The artificial intelligence structure may comprise, or consist of, an artificial neural network. The artificial intelligence structure may realize a forward model which may be based on computational fluid dynamics, electrophysiology, electromechanics and/or the like. The artificial intelligence structure may in particular be configured to generate, by taking the workpiece properties as input, an artificial supplementary processing plan. The artificial supplementary processing plan may map the frequency of the workpiece properties as determined.

In some advantageous embodiments, the workpiece properties comprise a set of parameters. A parameter may comprise a thickness parameter, which may be measured by pressure sensors or strain gauges. The thickness parameter is a parameter, which has to be considered for performing a bending process. The bending deduction depends on the material to be bent as well as on the sheet metal thickness (ratio of thickness to radius). A correctly determined thickness parameter as well as its consideration when generating the processing plan increases the precision of the manufacturing process and reduces the amount of scrap.

In other advantageous embodiments, a parameter may comprise a material structure parameter, which is measured by means of an x-ray spectrometer. An x-ray spectrometer uses a focused beam of charged particles to excite x-rays in a workpiece, thereby allowing for a qualitative and quantitative analysis of the material. There are two main types of analysis using x-ray spectrometers: energy-dispersive x-ray spectroscopy (EDS), which measures the energy of photons released by the workpiece, and wavelength-dispersive x-ray spectroscopy, which counts the number of x-rays of a single wavelength that have been diffracted by the workpiece. The material structure may also influence the processing of a workpiece. Knowledge about the structure of the workpiece enables the adaption of the processing plan.

In some advantageous embodiments, the workpiece properties/parameters may comprise a hardening capacity parameter of the material. Hardening is a metallurgical metalworking process used to increase the hardness of a metal. The hardness of a metal is directly proportional to the uniaxial yield stress at the location of the imposed strain. A harder metal will have a higher resistance to plastic deformation than a less hard metal. The hardening capacity parameter or short hardness parameter, describes the hardening of a workpiece. It is measured by means of hardness testing device. Hardness testing devices are devices used to perform comparative tests to determine hardness. A hardness testing device generally has an indenter. With this indenter, the workpiece is usually loaded with a defined force and a specified time. This produces an impression, which is then measured optically or manually with calipers. Alternatively, the penetration depth is measured and evaluated. Generally, hardness (surface) has a direct influence on the penetration capacity of the punch on the material surface, this makes a physical dent in the material, the depths of this dent must be added to the calculated penetration depth to get to the correct angle. It does also have an influence on the shape of the deformation itself which has an influence on the inside radius. A parameter may comprises a grain parameter. This has the technical background, that the direction of the material grain has an influence on the "toughness" of the material. The radius is different from one direction to the other. This changes the needed penetration depths to get to the correct angle. On some materials the grain direction can be "seen", so a camera would be sufficient. Most sheets are fed into the machine with the same grain direction since they all come from a coil. The parts can be "nested" in different directions so the bend lines end up with different grain directions. However, in some applications, a sheet metal may be reused. In this case, the grain direction might be "lost". Image analysis of the surface of the sheet metal may be used, to recognize the grain direction.

In some advantageous embodiments, the workpiece properties (and the related parameters) may comprise an internal tension and/or a yield tensile strength parameter. The yield strength influences the spring back of the material and the radius, therefore directly influencing the bend results. It can be measured by a combination of hardness, and material composition. Also, color changes are an indication of tensile and yield strength differences, which therefore are detected and analyzed.

In some advantageous embodiments, the workpiece properties (parameters) may comprise a temperature parameter and/or other material property parameters. Temperatures can cause a change in length of the metal. In particular, there may be different temperature coefficients depending on the workpiece, which must be taken into account during cutting and bending. A change in length of the workpiece during processing may result in lower quality or scrap.

All the parameters mentioned before will evolve during the processing. They will follow a defined model which is based on the values measured at the initial state. The set of parameters might be configurable and/or extendible in a preparation phase. This has the technical advantage that the supplementary processing plan is more adjustable and scalable to the concrete application and use case.

In some advantageous embodiments, the thickness parameter of the workpiece is measured only once in a measuring cycle or during workpiece entry in an automation system, in particular while table changes. An automation system in the present context has to be understood to mean the system that transports or provides the workpiece to the processing machine. The automation system may comprise conveyor belts, transport and lift units, which comprise transporting functionalities and lifting functionalities. The transport and lift unit may consist of conveyor rollers for moving the workpieces and of a lifting table to compensate certain height differences. The automation system may comprise means to measure the workpiece, in particular the workpiece properties. Measuring the thickness parameter only once is more efficient as only one measurement has to be executed.

In some advantageous embodiments, the workpiece properties, in particular the thickness parameter, are/is measured location-independently. Therefore, the measurement of the thickness parameter is only performed once or at one location. The result is indicative for the entire workpiece. In this way, the method for performing the measurement is more efficient and simpler.

In some further advantageous embodiments, the workpiece properties, in particular the thickness parameter, are/is measured for several times at different locations on the workpiece providing a two-dimensionally spatially resolved property map of the workpiece. Advantageously, measuring for several times may provide a much more detailed overview of the thickness parameters from the workpiece with the advantage that the processing plan may be supplementary on a part-specific level of detail.

In some advantageous embodiments, the thickness of the workpiece is measured by means of at least one distance sensor. Thickness measurements can be carried out with both, contact and non-contact sensors, whereby non-contact measuring methods offer advantages in terms of accuracy and measuring speed. One-sided thickness measurements are to be carried out exclusively with non-contact sensors. Only one sensor is used to measure the thickness of the workpieces and either only a part of the measuring workpiece thickness (e.g. layer thickness) or the complete measuring workpiece thickness is measured. Two-sided thickness measurements are carried out with at least one pair of sensors mounted in one axis to each other. This sensor pair measures synchronously on the measuring object. The difference between the individual measurement results is the thickness of the workpiece.

Which kind of measuring principle can be used to measure the thickness of metal sheets has to be checked depending on the use case. Laser sensors can be used. Laser sensors offer a high resolution and measuring rate at a high base distance. In an embodiment, capacitive sensors or eddy current sensors, which offer a higher resolution than laser sensors, can be used. The advantage of eddy current sensors is that they only react to metallic objects. If, for example, liquids or non-metallic foreign bodies are present in the measuring gap, this does not affect the measurement. Capacitive sensors also master this task. They offer resolutions in the nanometer range, but require a clean environment.

Further, a distance sensor or a set of distance sensors may be used. As there is more space available on the automation system, there it does exist more space to integrate the at least one and preferably two sensors. Alternatively, by providing a referenced face, just only one sensor may be used.

In some advantageous embodiments, the distance sensor is located on a transfer unit of an automation system. In another preferred embodiment, also a thickness sensor may be used instead of a distance sensor. In this document, everywhere a distance sensor is mentioned, also a thickness sensor may be applied and used, too.

In some advantageous embodiments, a thickness or distance sensor may be located at different machines or positions, e.g. on a laser head of a laser cutting machine. Preferably, the sensor is placed remotely on another machine which is in data exchange with the planner. This remote machine does drilling or milling work on the sheets before, and/or after laser cutting. In this case the laser cutting machine does not need any supplementary equipment (e.g. sensors).

In some advantageous embodiments, the sensor is located on a drilling head or another processing head. In this case, we can also use the spindle as a sensor. This has the technical advantage that the drilling process can provide the thickness information but also the hardness of the material. As a consequence, two different parameters may be deduced from one sensor.

In some advantageous embodiments, a part-specific function is provided, which maps the measured workpiece properties to the particular part, which has been cut and wherein each cut part is marked with a property-specific identification code. Preferably, the property-specific identification code may be implemented as an index on the part (e.g. number/name). The "rest" (necessary data for the identification procedure) would be saved in the database The particular part which has been cut can be evaluated as having different material properties, such as thickness and/or hardness. Further, the property-specific identification code can be used to identify parts with its corresponding properties. Further, property-specific identification code comprises an identification information of the specific part to store required information, in particular property values under the label of the property-specific identification code in a memory. In this way, information for each specific part (cut part) can be search and reviewed. In an alternative embodiment, in case that more than one parameter has been measured for a part, an average value of the measured values can be determined and used for further processing or stored in the memory using the property-specific identification code.

In some advantageous embodiments, the marking comprises laser engraving. Laser engraving refers to labeling or marking of workpieces with the aid of an intensive laser beam. The laser engraving changes the inscribed workpiece itself. The process and energy input therefore depend on the material. Advantageously, laser engravings are waterproof, smudge-proof and durable. Laser engravings can be generated quickly, automatically and individually, as well as independent of the workpiece. It is also possible to apply very small machine-readable markings such as a QR code, Barcode, or a Data Matrix code directly to the workpiece or the cut parts.

In an alternative embodiment, laser printing can be used to generate the property-specific identification code. In contrast to laser engraving, with laser printing only the pigment application on the printed part is controlled by a weak laser beam.

In some advantageous embodiments, the marking comprises surface printing. Surface machines lay down very heavy amounts of ink. Because the ink is pushed onto the material, the images are not as crisp as the other methods. Also, there is no drying stage between laying down each color, so the order of color run-throughs is very important to keep the inks from running into each other. Because of the amount of ink required for impressions, and the inexact image rendering, surface printing has a very distinct look.

In some advantageous embodiments, the marking comprises applying etiquettes. An etiquette, also a label can be designed as a piece of paper, plastic film, cloth, metal, or other material affixed to the workpiece or cut part. On the etiquette, the property-specific identification code can be written or printed. In an embodiment, the property-specific identification code can be printed as a barcode or QR-code that can be read via a scanner or handheld and using a corresponding software application.

In some advantageous embodiments, the method further comprises the step after having measured the workpiece properties of evaluating whether the measured properties do have a technical effect on subsequent processing steps and only if yes, the supplementary processing plan will be calculated. Advantageously, less computational resources are required. When, for example, the effect of difference in thickness compensates for the effect in difference in tensile strength and thus eliminate each other, the basic program can be used.

The invention also provides a computer program product causing a processor in a computer, related to a processing unit of a planner to execute the method according to any of the preceding method claims, when the computer program is executed on the computer. The realization of the invention by a computer program product has the advantage that already existing processing units, such as computer, industrial computers, or server units can be easily adopted by software updates in order to work as proposed by the invention.

According to a second aspect, a planner for calculating at least one supplementary processing plan for a sheet metal workpiece to be processed by a processing machine, namely by a laser cutting machine and/or a bending machine is provided. The planner comprises an interface for receiving workpiece properties, including a thickness parameter. The planner further comprises a processing unit, which is adapted for calculating at least one supplementary processing plan, which is specific for the measured workpiece properties.

According to a third aspect, an automation system, including a processing machine, in particular a laser cutting machine with a planner according to the present invention is disclosed.

BRIEF DESCRIPTION OF THE DRAWINGS

The properties, features and advantages of this invention described above, as well as the manner they are achieved, become clearer and more understandable in the light of the following description and embodiments, which will be described in more detail in the context of the drawings. This following description does not limit the invention on the contained embodiments. Same components or parts can be labeled with the same reference signs in different figures. In general, the figures are not for scale. It shall be understood that a preferred embodiment of the present invention can also be any combination of the dependent claims or above embodiments with the respective independent claim.

In the following possible embodiments of the different aspects of the present invention are described in more detail with reference to the enclosed figures.

The scope of the present invention is given by the claims and is not restricted by features discussed in the description or shown in the figures.

Figure 1:
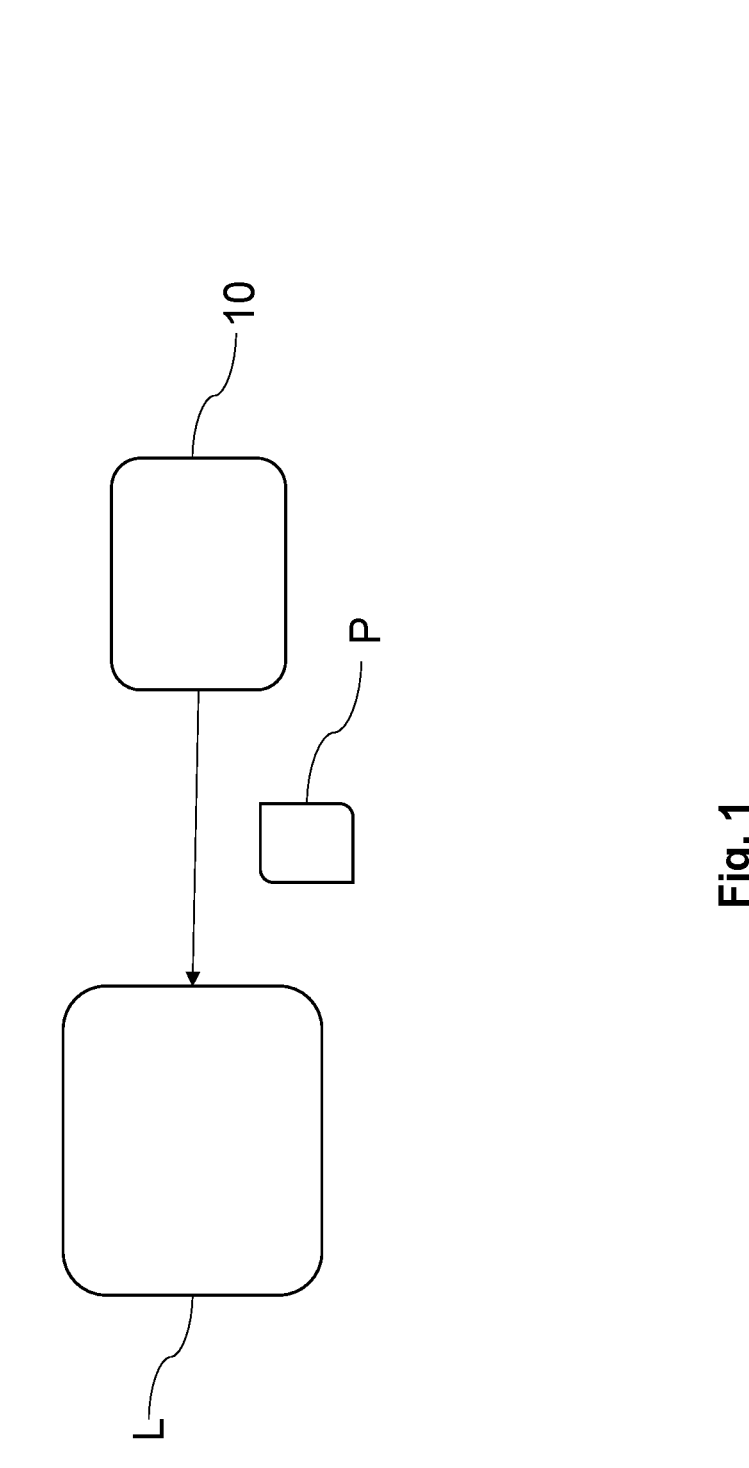
Figures 2, 3:
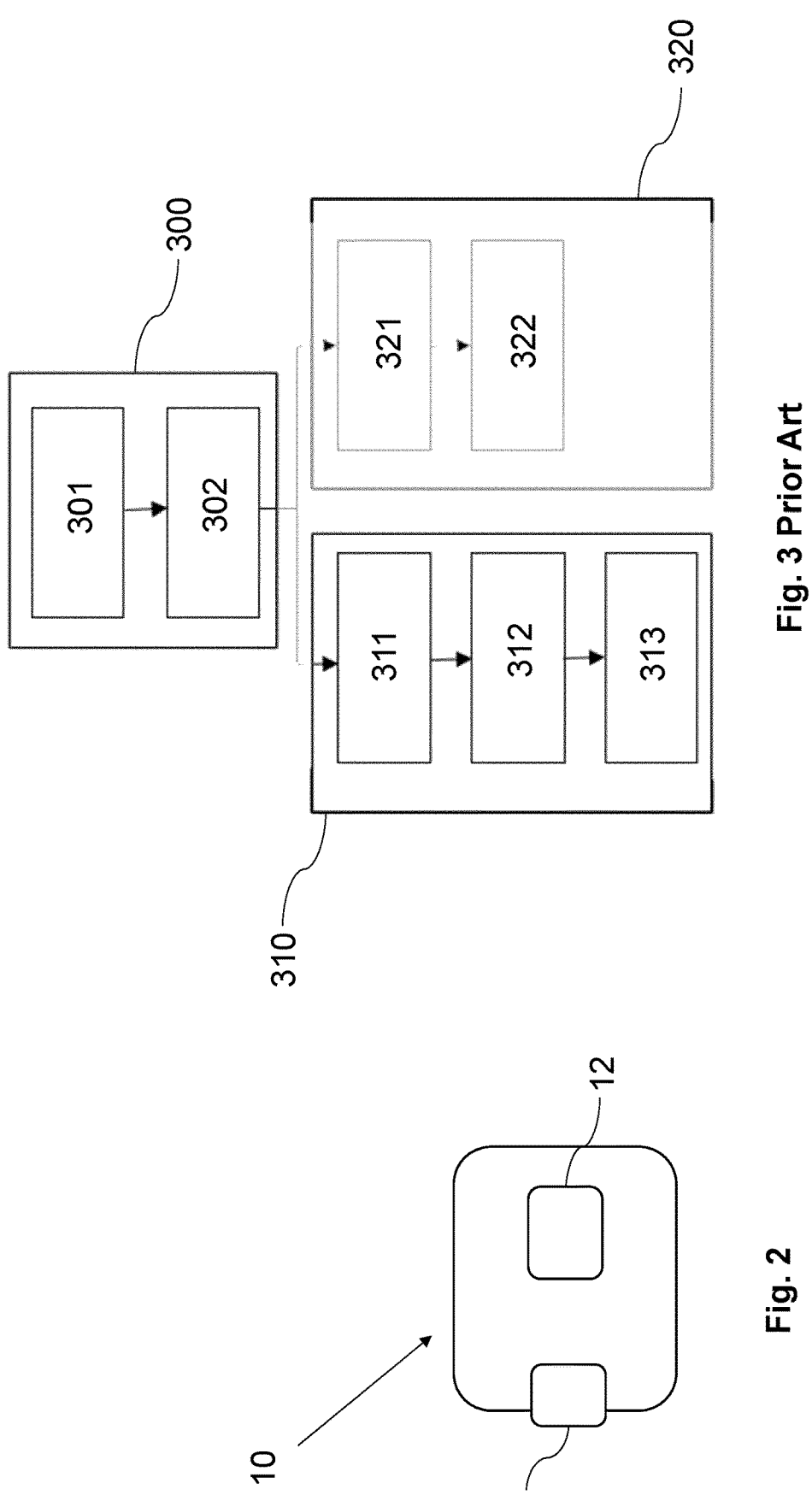
Figures 4, 5:
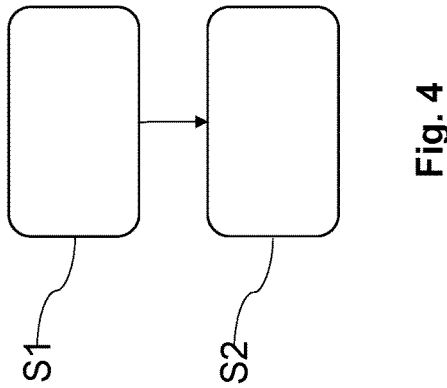
Figure 6:
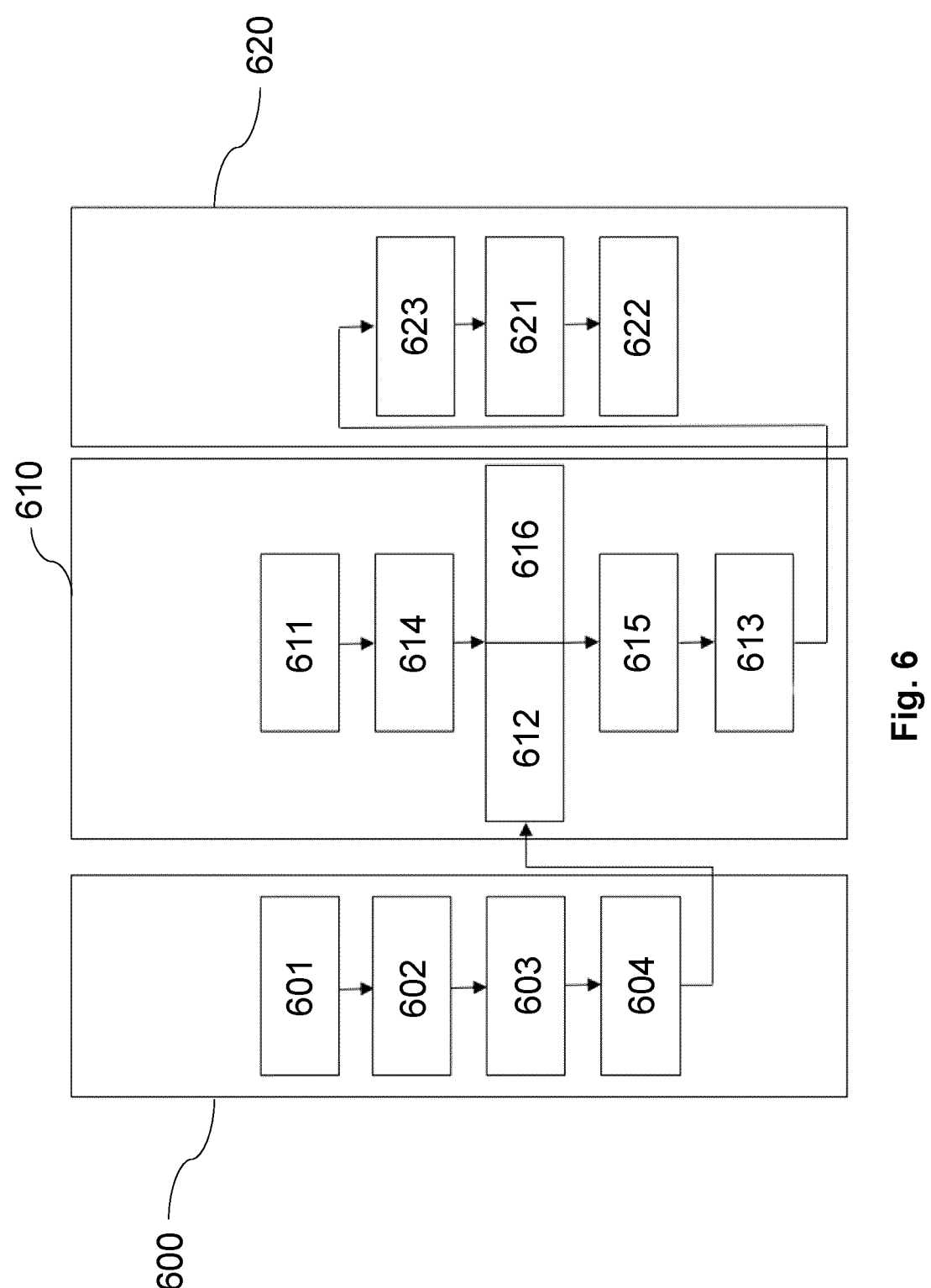

FIG. 1 schematically illustrates an automation system to an embodiment of the third aspect;

FIG. 2 schematically illustrates a planner to an embodiment of the second aspect;

FIG. 3 schematically illustrates a state-of-the-art method to produce a bend part;

FIG. 4 schematically illustrates a method according to an embodiment of the first aspect;

FIG. 5 schematically illustrates a method according to a further embodiment of the first aspect;

FIG. 6 schematically illustrates a method according to a further embodiment of the first aspect;

FIG. 7a-7e schematically illustrates a method according to a further embodiment of the first aspect;

FIG. 8a-8d schematically illustrates a method according to a further embodiment of the first aspect; and FIG. 9 schematically illustrates a part produced with a further embodiment of the present invention.

DETAILED DESCRIPTION OF THE INVENTION

FIG. 1 schematically illustrates an automation system 100 according to an embodiment of the third aspect of the present invention.

In the embodiment shown in FIG. 1, a planner 10 has access to a processing machine, in particular to a laser cutting machine L and/or to a bending machine B. The planner 10 can be configured as a stand-alone electronic device. In an embodiment, the planner 10 is part of the processing machine L. The planner 10 may be connected to the processing machine L via a communication connection. The communication connection may comprise a serial communication connection, such as, Ethernet, CAN-Bus and/or RS-485. The planner 10 is configured to calculate at least one supplementary processing plan P for a workpiece to be processed by the processing machine L. For calculation of the supplementary processing plan P multiple parameters are considered separately or in different combinations. The workpiece properties taken into account may comprise the thickness, material composition, hardness, yield tensile strength, and hardening capacity of the workpiece W. Every workpiece property does not have the same effect on the quality of cut part. Any of the properties or in combination add some errors in the calculation of the supplementary processing plan P, and further combination may equalize the error.

The processing machine may further be provided in the form of a bending machine B. The bending machine B may also receive a supplementary processing plan P for a workpiece. The supplementary processing plan P is adapted for the specific measured workpiece properties.

FIG. 2 schematically illustrates a planner 10 to an embodiment of the second aspect.

The planner 10 may be implemented as any type of electronic device comprising a processor 12, such as a general-purpose central processing unit (CPU), a specific purpose processor or a microcontroller. The processor 12 is adapted to execute a special computing task, namely for calculating at least one supplementary processing plan P for a workpiece W to be processed by a processing machine L,B. The electronic device for performing the above calculation task may be a personal computer or a workstation on a computer network and may include the processing unit 12, a system memory and a system bus coupling various system component including the system memory to the processing unit 12. The computer may also include a hard disk drive for reading from and writing to a hard disk. The hard disk drive can be coupled to the system bus via a hard disk interface. The drive provides non-volatile storage of machine-readable instructions, data structures, program modules, and other data for the computer. Further, measured workpiece properties and/or generated supplementary processing plans P may be stored on the hard disk drive of the planner 10. In an alternative embodiment, workpiece properties and/or supplementary generated processing plans P may be stored centralized in a server structure, or in a cloud computing system.

An operator can enter commands and information into the planner 10 using input devices, such as a keyboard and pointing device. Other input devices, such as a microphone, touch surfaces, scanner, or the like, may also be included. These and other input devices are often connected to the processing unit via a serial interface coupled to the system bus. However, input devices can also be connected via other interfaces, such as a parallel port, or a universal serial bus (USB). A monitor (e.g. a GUI) or other type of display device can also be connected to the system bus via an interface such as a video adapter. In addition to the monitor, the computer can also contain other peripheral output devices such as speakers and printers.

Further, the planner comprises an interface 11. The interface 11 is configured to connect the planner 10 to the means detecting the workpiece properties and to the processing machine L, B. The interface 11 may comprise an input and an output interface and may be configured to receive data (input), e.g. workpiece properties, including a thickness parameter, for performing the calculation for at least one supplementary processing plan, and providing thereby the result of the calculation in the form of the supplementary processing plan P (output). The interface 11 is further configured to provide the supplementary processing plan to the processing machine. In an embodiment, two separate interfaces can be implemented in the planer 10 configured to connect the planer 10 for communication with the processing machine L, B and/or the means, e.g. sensors for measuring workpiece properties.

Further, the interface 11 can be configured for connecting the planner 10 to a network such as an intranet and/or the Internet comprising. Therefore, the interface can be configured as an ethernet interface. In a further embodiment, an additional ethernet interface can be provided. The communication of the processing machine and the means, e.g. sensors for measuring workpiece properties is provided over these networks. In an embodiment, the planner 10 may partially or completely be hosted on a server, or implemented by a cloud computing platform. An operator may access the planer via remote access.

As mentioned before, the interface 11 may be configured to comprise an output interface (not specifically shown in the figures) to provide the supplementary processing plan P.

FIG. 4 schematically illustrates a method according to an embodiment of the first aspect.

The method comprises in the illustrated exemplary embodiment two steps. In a first step S1, workpiece properties are measured. The workpiece properties at least include a thickness parameter of the workpiece. In an embodiment of the method, further workpiece properties can be measured, such as material structure parameters, material hardness parameter, a grain parameter, an internal tension and/or a yield tensile strength parameter, a hardening capacity parameter, and/or a temperature parameter.

In a further step S2, at least one supplementary processing plan P, which is specific for the measured workpiece properties, is provided. The supplementary processing plan P comprises at least a supplementary cutting plan. In an embodiment, the supplementary processing plan serves for both for cutting and bending. The supplementary processing plan is specific for the measured workpiece properties.

In an embodiment, the method according to the first aspect further comprises the step of providing the supplementary processing plan P to the processing machine L, B, and operating the processing machine L, B with the supplementary processing plan P. The processing machine may comprise a cutting machine L and/or a bending machine B.

In a further embodiment, the method according to the first aspect comprises after having measured the workpiece properties the step of evaluating whether the measured properties do have a technical effect on subsequent processing steps and only if yes, the supplementary processing plan P will be calculated.

Advantageously, the measured workpiece properties can be used to improve the processes that are processed on the cut parts, such as milling, drilling, tapping, and/or welding.

FIG. 5 schematically illustrates a method according to a further embodiment of the first aspect. In particular FIG. 5 schematically illustrates providing the supplementary processing plan by an offline procedure (or pre-active procedure) by selecting an appropriate processing plan from a set of ("pre-actively") pre-calculated processing plans P for different workpiece properties.

In the embodiment shown in FIG. 5, a software 500 including a part in a 3D data format 501 to be manufactured is provided. The 3D data format 501 is unfolded in a plane shape 502. In the offline-procedure multiple supplementary processing plans 503 are generated instead of one flat pattern. One processing plan 503 for each one of a specific couple of thickness and tensile strength around the nominal one is provided. In step 504 an identification may be generated which may be associated to the respective plan. A processing plan for each parameter of the workpiece properties that diverges from the nominal one is generated 505. The planner 10 generates a different processing plan P, in particular a different cutting plan and a different bending plan.

The generated processing plans P are transferred and loaded in step 511 to the processing machine L, B, in particular to the laser cutting machine L. In the laser cutting machine L or in the automation of the automation system 100, the workpiece properties may be measured 514. The measurement may comprise a thickness measurement. In step 512 the appropriate supplementary cutting plan P is loaded. The processing plan P comprising the closest values to the measured thickness values is loaded into the laser cutting machine L and processed 515 on the sheet metal, which has been loaded in step 511. In step 513 the identification is updated. The measurement of the workpiece properties can be performed in the laser cutting machine L or at the automation 510. The automation of the automation system 100 may comprise conveyor belts, transport and lift units, which comprise transporting functionalities and lifting functionalities. The cut parts are marked with a measurement-specific or property-specific identification code C (meaning that the code C is specific for e.g. the measured thickness of the material or the grain etc.).

In step 523 the part is identified by means of the identification, which has been added to the part previously. In step 521 the appropriate supplementary processing plan P is loaded or selected from the set of pre-calculated plans. In a subsequent step 522 the material or the cut part is bent according to the selected supplementary processing plan P. The property-specific identification code C may comprise a laser engraving, surface printing, and/or apply etiquettes or labels. After marking the cut part, said parts are transferred to the bending machine B (reference numeral 520 in FIG. 5).

In an alternative embodiment, the workpiece properties are measured on the automation of the automation system 100. The workpieces are marked with a property-specific identification code C that corresponds to the measured property value before loading the workpiece, e.g. sheet metal on the laser cutting machine L. The property-specific identification code is read, e.g. by a scanner, camera and the corresponding supplementary processing plan is loaded to process the cutting.

After reading 523 the property-specific identification code C in the bending machine B via a scanner or camera, the corresponding bending program for processing the bending 522 is loaded 521. In this way, using the method according to present invention, increases the accuracy in the complete production line.

FIG. 6 schematically illustrates a method according to a further embodiment of the first aspect. In particular FIG. 6 schematically illustrates providing the supplementary processing plan by calculating the at least one supplementary processing plan in an online procedure (or re-active procedure).

In the embodiment shown in FIG. 6, a software 600 including a part in a 3D data format to be manufactured is provided. The 3D data format is received or read in step 601 and is unfolded in a plane shape in step 602. An identification is added in step 603. The the so called "plan ID" can contain a "new" plan and/or a sub plan number and/or a factor or factors to recalculate the existing plan. The plan ID should be adjusted such as the part IDs. The identification provides information in order to be able to recognize what is the part. Further, a processing plan is generated 604 using theoretical values of the material (nominal values for thickness, metallurgical values etc. which may be received by an interface of the sheet metal supplier). The processing plan may comprise the cutting plan for cutting a workpiece, e.g.

a metal sheet. The processing plan with all the base parts is send to the processing machine L, B, in particular to a laser cutting machine L.

The processing machine L (in FIG. 6 depicted with reference numeral 610) loads the sheet metal in step 611. The sheet metal is provided by the automation of the automation system 100, which may comprise conveyor belts and/or transport and lift units, which comprise transporting functionalities and lifting functionalities. The measurement (or the detection of properties in step 614) of the workpiece properties can be performed in the laser cutting machine L or at the automation. In a further step 612, the generic processing plan provided, comprising theoretical values is loaded into the processing machine L, B. After the workpiece properties are measured and known, the generic processing plan loaded into the processing machine (step 612) is recalculated in step 616 and adjusted according to the measured workpiece properties. Thus, the supplementary and specific processing plan P is generated and calculated "re-actively" in response to the detected material properties (measured or received) in step 616, namely after the measurements have been executed or the values for the measurements have been provided (e.g. via external interfaces). The workpiece is cut in step 615 using the supplementary processing plan P which has been recalculated according to the online procedure. Further, according to the supplementary processing plan P, the property-specific identification code C for the cut parts is updated in step 613. The property-specific identification code C is added to the cut part by laser engraving, surface printing, and/or applying etiquettes or labels. On the basis of the measured workpiece properties, the correct radius is applied and the bend deduction per bend is adjusted as well as the value for the spring back and the correction for the "hardness dent".

Further, a new bending plan may be generated and provided to the bending machine B after generating the supplementary processing plan (cutting plan). The parts to be bent are identified in step 623 by using the unique property-specific identification code C. In the bending/automation 620, the bending plan that corresponds to the property-specific identification code C is loaded in step 621. The bending plan comprises instructions for the bending machine B to perform the bending process in step 622. In an embodiment, the bending plan is performed, when an operator of the bending machine B triggers and verifies the load of the bending plan corresponding the property-specific identification code C of the cut part. The manual verification improves security. All parts that have different values in its properties that are represented with the property-specific identification code C (which may then be a multi dimension code, like a vector, representing multiple material properties as mentioned above). This is necessary to identify the parts before performing the bending procedure. Further, it assures that the correct supplementary processing plan P for the bending is automatically loaded. The cut parts can be identified by the property-specific identification code C integrated with a laser by engraving, printing the surface use etiquettes or labels.

FIG. 7a-7e schematically illustrates a method according to a further embodiment of the first aspect.

In FIG. 7a a workpiece W, e.g., a sheet metal is shown. The workpiece W may comprise an uneven thickness distribution. Exemplary, in FIG. 7a two different values are shown. In practical measurements, even more different values are measured (see FIG. 7b). Reference numeral 701 refers to the thickness that can be provided by the supplier of the workpiece and is used for programming the processing plan in the state-of-the-art method as described according to FIG. 3. This provided thickness usually does not always correspond to the actual (real, measured) thickness values. Also, the thickness value may vary over the entire workpiece W. To ensure consistent quality during cutting and bending, all thickness value or its deviations of the nominal one over the entire workpiece W must be taken into account (see FIG. 7*b*). In an embodiment, the measurement may comprise a manual measurement using a caliper. The caliper can be used to measure a thickness value 702. The measurement as presented according to FIG. 7*a* may provide a global thickness information for the entire workpiece W.

In an alternative embodiment, the measurement may comprise an automatic thickness detection on the automation of the automation system 100 during transfer of the workpiece W to the processing machine L. In this embodiment, the sensor S can be installed at the automation of the automation system 100.

In a further embodiment, the measurement of the thickness is performed by a sensor S. The sensor S can be installed on the laser head itself inside of the cutting machine. The sensor S performs the measurement in a specific cycle/run of the processing machine L.

In FIG. 7*b*, a workpiece 7*b* has been transferred by the automation of the automations system 100 and loaded into the processing machine L. The laser head comprising the sensor S can be moved around the sheet metal. A real-thickness topography of the workpiece W can be created and resulting in a supplementary processing plan P for cutting workpiece W and bending the cut parts.

FIG. 7*c* shows a further embodiment of measuring the thickness of the workpiece W. The thickness of the workpiece W is measured while transferring the workpiece W by the automation of the automation system 100 into the processing machine L The laser head can only be used in one direction and the sensor S measures during the entry of the workpiece W at the far end. By performing this measurement, a reference device under the automation, e.g. a shuttle device can be used. A real-thickness topography of the workpiece W is created resulting in a supplementary processing plan for cutting the workpiece W and bending the cut parts.

Figure 7D:
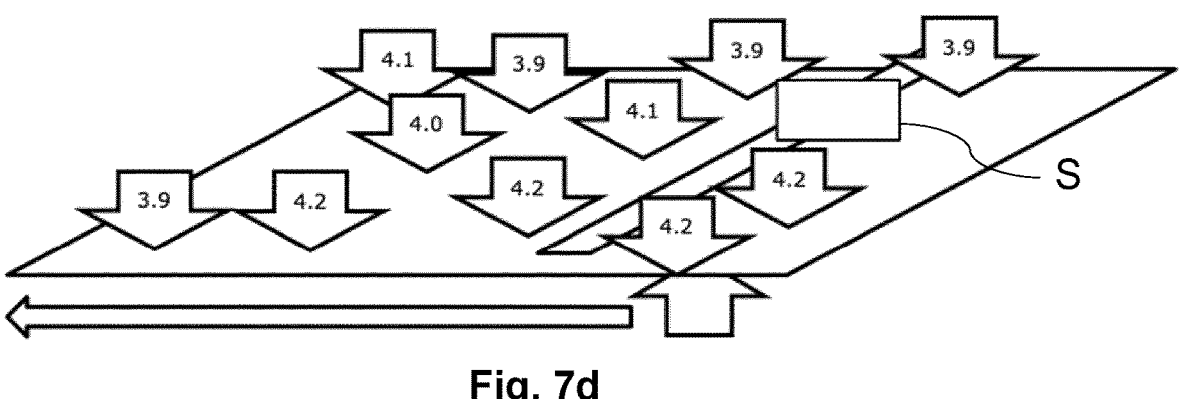

In a further embodiment, the thickness measurement can be performed by an array of laser distance measuring devices during part entry from the automation of the automation system 100 while, for instance, the transportation table from the automation to the processing machine L change. In FIG. 7*d*, the sensor S, for instance a laser distance measuring device can be mounted above and below the entry position of the sheet and a "delta" measurement can be taken. A real-thickness topography of the workpiece W can be created and resulting in a supplementary processing plan P for cutting the workpiece W and bending the cut parts.

Figure 7E:
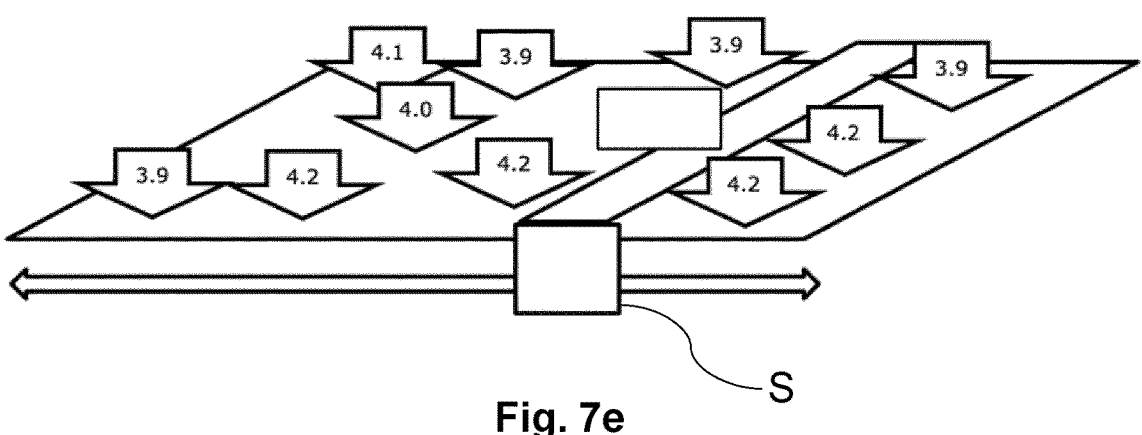

In a further embodiment, as shown in FIG. 7*e*, the thickness measurement can be performed by a sensor S on the drilling head of a drilling system. In the embodiment of FIG. 7*e*, the measuring can be processed when the workpiece W is loaded in the processing machine L or while entry the processing machine L.

According to FIG. 7*a*-7*e*, only the workpiece property "thickness" has been considered. During these measurements also the further workpiece properties as material structure parameter, material hardness parameter, grain parameter, internal tension and yield tensile strength parameter, hardening capacity parameter, and temperature parameter can be measured by using corresponding measurement methods.

Figures 8A, 8B, 8C, 8D:
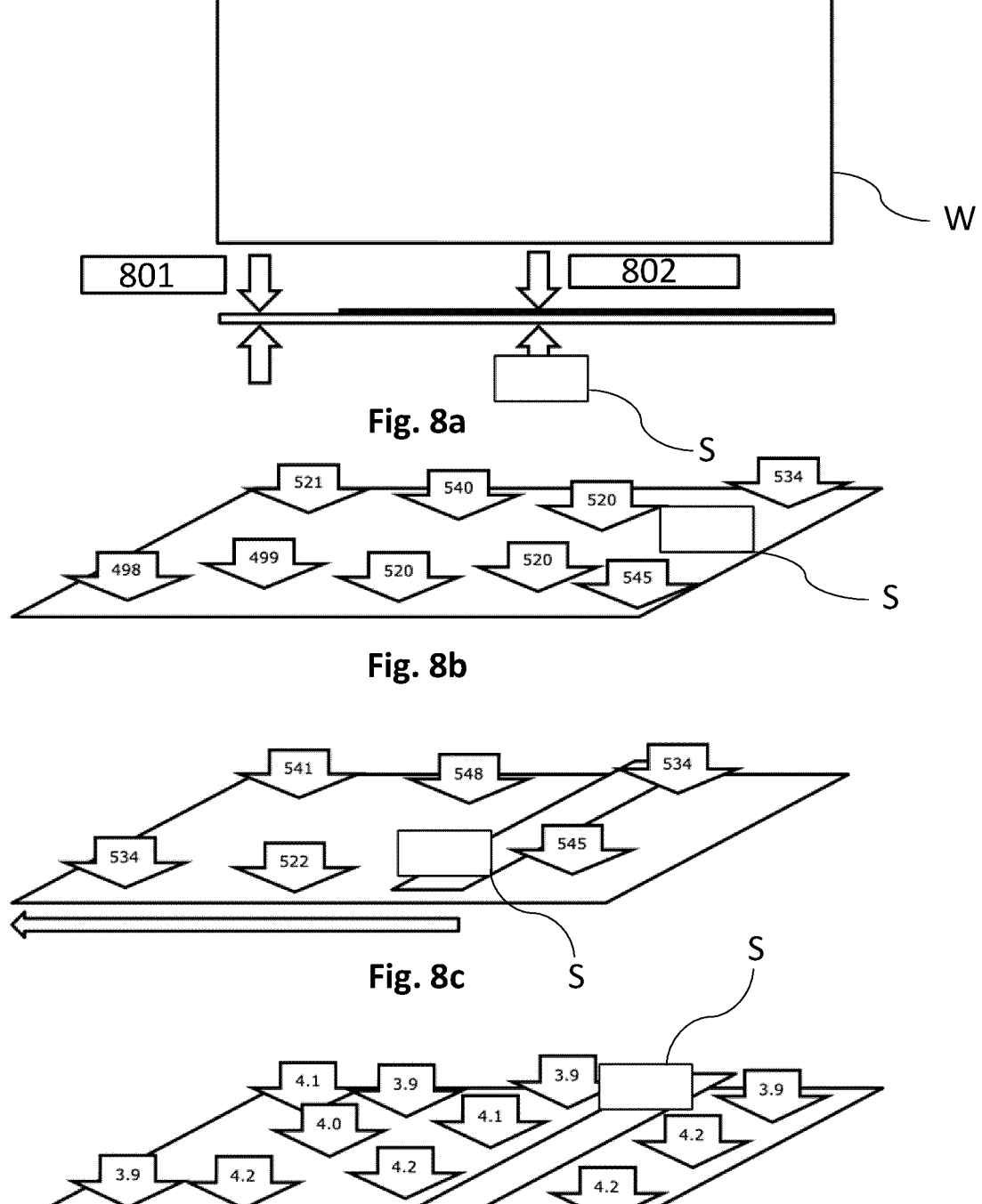

FIG. 8*a* schematically illustrates a method according to an embodiment of the first aspect.

In FIG. 8*a* a workpiece W, e.g., a sheet metal is shown. The workpiece W comprises a structure that has to be detected before stating to cut the sheet metal. Therefore, in a first step a structure recognition may be performed. There is a plurality of devices available to get these basic parameters, such as hardness tester or X-ray fluorescence spectrometer to provide information about the hardness and the material type. The hardness tester may provide a good indication for how much the workpiece W deviates from a reference material. The X-ray fluorescence spectrometer may provide a good indication about the material type. If the material composition inside of the workpiece W does not vary much, one measurement can be sufficient.

The detection of the material structure of the workpiece W as shown in FIG. 8*a* can be performed manually or automatically. The hardness tester or the X-ray fluorescence (sensor S) spectrometer, or both can be mounted near the laser head.

As shown in FIG. 8*b*, the laser head can be moved around after the workpiece W has entered the cutting area in the cutting machine L. A hardness chart can be created that provides precise composition information of the entered workpiece W.

In a further embodiment, as shown in FIG. 8*c*, one or both devices can be used with the laser head itself during the entry of the workpiece W from the automation of the automations system 100 into the cutting machine L. The laser head can be moved in one direction and measures during the entry of the workpiece W at the far end. A hardness chart can be created that provides precise composition information of the entered workpiece W.

In a further embodiment, as shown in FIG. 8*d*, the structure recognition can be performed by a sensor S on the drilling head of a drilling system. The sensor may comprise the hardness tester or the X-ray fluorescence spectrometer. In the embodiment of FIG. 8*d*, the measuring can be processed when the workpiece W is loaded in the processing machine L, B or while entry the processing machine L, B. A hardness chart can be created that provides precise composition information of the entered workpiece W.

FIG. 9 schematically illustrates a part produced with an embodiment of the present invention.

Figures 9A, 9B, 9C:
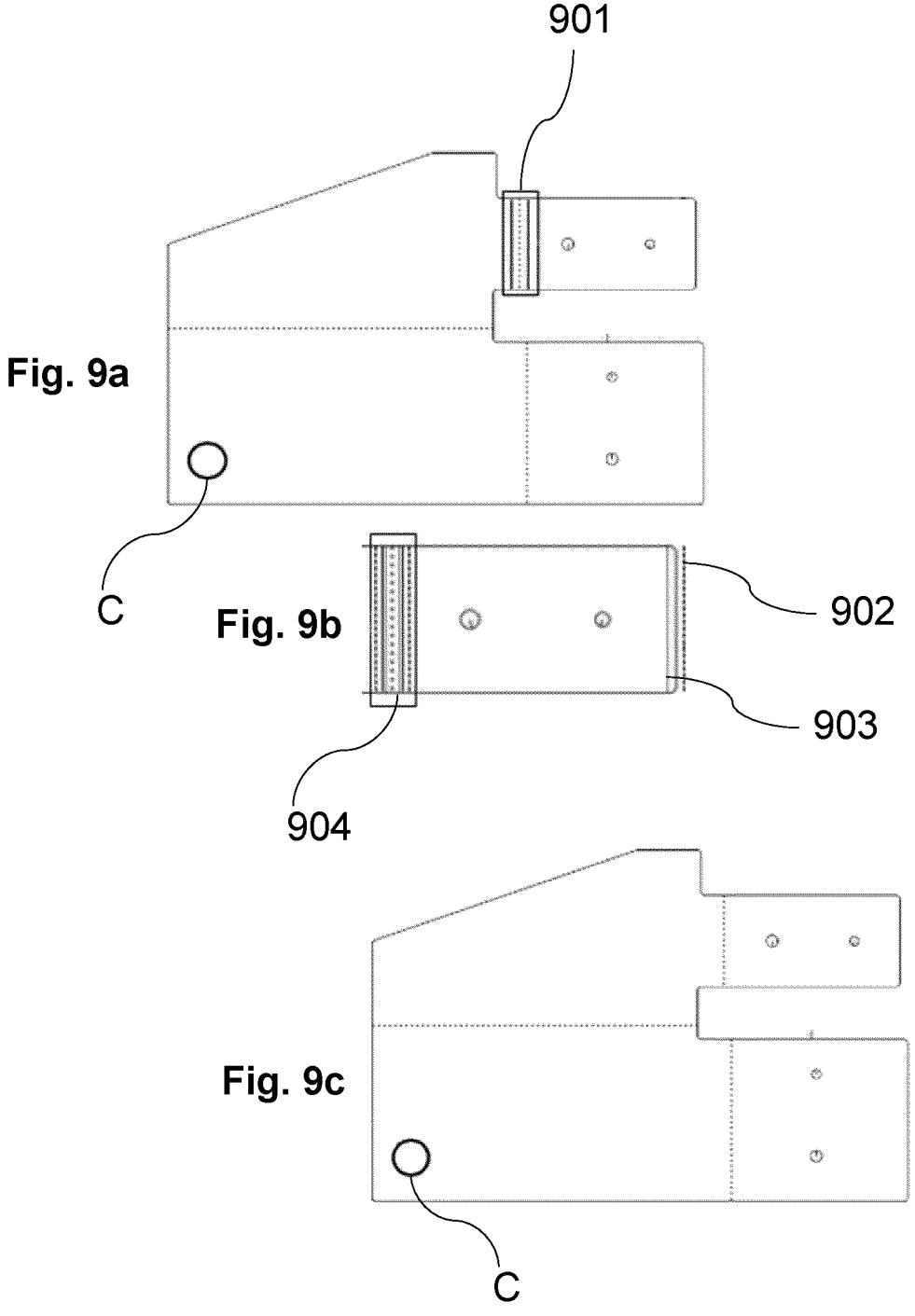

In the embodiment of FIG. 9*a*, a part produced is shown. When nesting parts with multiple contours, enough space has to be provided to be able to insert the part with the new blank compensated for material variations. Grain direction is an offset to the bend parameters that can handled with a software feature. With the two parameters, the sheet metal can be mapped and the blanks can be adjusted. In various cases, a change in hardness eliminates or compensates for a difference in thickness. In further cases, these variations amplify each other. The sheet map can be created with different zones integrating hardness parameters, thickness parameters, and/or material compositions. Material compositions are valid for the entire sheet metal but can vary compared to the original material. In FIG. 9*a*, reference numeral 901 refers the area affected by the radius change.

Further, the tolerance of the cut parts has to be considered while programming the supplementary processing plan. As the parts are designed with the theoretical thickness, it is by definition impossible to reach all the dimensions if the thickness of the workpiece varies. During the programming step, the dimensions to be critical have to be defined and where a possible error should be shifted. In a control step, it has to be verified whether the parts can be produced and whether there is no conflict between the dimensions and tolerances.

In FIG. 9*b*, the reference numeral 904 refers to the new length of the radius area after application of the supplementary processing plan P comprising the new couple thickness/material properties. The reference numeral 902 and 903 refer to the new position of the edge after application of the new supplementary processing plan P comprising the new couple thickness/material properties.

In FIG. 9*c* a cut part comprising the property-specific identification code C is shown. All parts that have different values in its properties are marked with the property-specific identification code C. This is necessary to identify the parts before performing the bending procedure.

Wherever not already described explicitly, individual embodiments, or their individual aspects and features, described in relation to the drawings can be combined or exchanged with one another without limiting or widening the scope of the described invention, whenever such a combination or exchange is meaningful and in the sense of this invention. Advantages which are described with respect to a particular embodiment of present invention or with respect to a particular figure are, wherever applicable, also advantages of other embodiments of the present invention.

REFERENCE NUMERALS

L, B Processing machine
B Bending machine
C Identification code
L Laser cutting machine
P Supplementary processing plan
S Sensor
S1-S2 Method steps
W Workpiece
10 Planner
11 Interface
12 Central processing unit
100 Automation system
300-302 Steps of a prior art processing method
310-313 Steps of a prior art processing method
320-322 Steps of a prior art processing method
500-505 Steps of a processing method
510-515 Steps of a processing method
520-523 Steps of a processing method
600-604 Steps of a processing method
610-616 Steps of a processing method
620-623 Steps of a processing method
701, 801 Provided thickness value
702, 802 Measured thickness value
901-904 Properties

The invention claimed is:

1. A computer-implemented method for calculating at least one supplementary processing plan for a sheet metal workpiece to be processed by a processing machine including a laser cutting machine and a bending machine, comprising the steps of:
  measuring workpiece properties including a material variation, the material variation including a thickness parameter of the workpiece;
  providing at least one supplementary processing plan, which is specific for the measured workpiece properties and wherein the at least one supplementary processing plan is provided before start of the processing;

wherein the at least one supplementary processing plan is a reworked plan of a previously programmed processing plan and serves for both for cutting and bending, and
  wherein the processing of the workpiece comprises cutting and bending of the workpiece and wherein at least the cutting plan is supplemented based on the measured workpiece properties and in addition based on the bending requirements.

2. The computer-implemented method according to claim 1, wherein the at least one supplementary processing plan is specific for a property distribution over the workpiece and is adapted to subsequent processing requirements.

3. The computer-implemented method according to claim 1, wherein the processing of the workpiece comprises cutting by a laser cutting machine, and the supplementary processing plan is a supplementary cutting plan.

4. The computer-implemented method according to claim 1, wherein providing is implemented by calculating the at least one supplementary processing plan in response to measured material properties after the material properties have been measured and before processing begins.

5. The computer-implemented method according to claim 1, wherein providing is implemented by an offline procedure by selecting an appropriate processing plan from a set of pre-calculated processing plans for different workpiece properties.

6. The computer-implemented method according to claim 1, wherein the workpiece properties comprise a set of parameters, comprising:
  a thickness parameter, which is measured by pressure sensors or strain gauges,
  a material structure parameter, which is measured by means of an x-ray spectrometer,
  a material hardness parameter, which is measured by means of hardness testing device,
  a grain parameter,
  an internal tension and/or a yield tensile strength parameter,
  a hardening capacity parameter of the material and/or
  a temperature parameter and/or other material property parameter.

7. The computer-implemented method according to claim 1, wherein the thickness parameter of the workpiece is measured only once in a measuring cycle or during workpiece entry in an automation system during table changes.

8. The computer-implemented method according to claim 1, wherein the workpiece properties, including the thickness parameter, are/is measured location-independently or is measured for several times at different locations on the workpiece providing a two-dimensionally spatially resolved property map of the workpiece.

9. The computer-implemented method according to claim 1, wherein the thickness of the workpiece is measured by means of at least one distance sensor, and/or on a laser head of a laser cutting machine and/or on a drilling head or another processing head.

10. The computer-implemented method according to claim 1, wherein a part-specific function is provided, which maps the measured workpiece properties to a particular part, which has been cut and wherein each cut part is marked with a property-specific identification code, wherein the marking comprises laser engraving, surface printing and/or applying etiquettes.

11. A non-transitory computer-readable medium storing instructions that, when executed by a processor, cause the processor to perform the method of claim 1.

12. A computer-implemented method for calculating at least one supplementary processing plan for a sheet metal workpiece to be processed by a processing machine including a laser cutting machine and a bending machine, comprising the steps of:

measuring workpiece properties including a material variation, the material variation including a thickness parameter of the workpiece;

providing at least one supplementary processing plan, which is specific for the measured workpiece properties and wherein the at least one supplementary processing plan is provided before start of the processing;

wherein the at least one supplementary processing plan is a reworked plan of a previously programmed processing plan and serves for both for cutting and bending, and wherein providing is implemented by:

calculating the at least one supplementary processing plan in response to measured material properties after the material properties have been measured and before processing begins or an offline procedure by selecting an appropriate processing plan from a set of pre-calculated processing plans for different workpiece properties.

13. A computer-implemented method for calculating at least one supplementary processing plan for a sheet metal workpiece to be processed by a processing machine including a laser cutting machine and a bending machine, comprising the steps of:

measuring workpiece properties including a material variation, the material variation including a thickness parameter of the workpiece;

providing at least one supplementary processing plan, which is specific for the measured workpiece properties and wherein the at least one supplementary processing plan is provided before start of the processing;

wherein the at least one supplementary processing plan is a reworked plan of a previously programmed processing plan and serves for both for cutting and bending, and wherein the thickness parameter of the workpiece is measured only once in a measuring cycle or during workpiece entry in an automation system during table changes.

* * * * *